United States Patent
Cole et al.

[11] Patent Number: 6,128,429
[45] Date of Patent: Oct. 3, 2000

[54] LOW PHONON ENERGY GLASS AND FIBER DOPED WITH A RARE EARTH

[75] Inventors: Brian Cole, Alexandria, Va.; Jasbinder Sanghera, Greenbelt, Md.; Brandon Shaw, Laurel, Md.; Barry Harbison, Dunkirk, Md.; Ishwar D. Aggarwal, Fairfax Station, Va.

[73] Assignee: The United States of America as represented by the Secretary of the Navy, Washington, D.C.

[21] Appl. No.: 08/920,878

[22] Filed: Aug. 29, 1997

[51] Int. Cl.⁷ .................................................. G02B 6/00
[52] U.S. Cl. .................. 385/142; 501/37; 501/40
[58] Field of Search ................ 385/142; 501/37, 501/40

[56]            References Cited

U.S. PATENT DOCUMENTS

| | | | |
|---|---|---|---|
| 5,378,664 | 1/1995 | Becker et al. | 501/40 |
| 5,392,376 | 2/1995 | Aitken et al. | 385/144 |
| 5,629,953 | 5/1997 | Bishop et al. | 372/39 |
| 5,735,927 | 4/1998 | Sanghera et al. | 65/389 |
| 5,846,889 | 12/1998 | Harbison et al. | 501/40 |
| 5,879,423 | 3/1999 | Sanghera et al. | 65/405 |

*Primary Examiner*—Rodney Bovernick
*Assistant Examiner*—Ellen E. Kang
*Attorney, Agent, or Firm*—Thomas E. McDonnell; George A. Kap

[57]           ABSTRACT

Disclosed herein is a low phonon energy glass and a fiber made therefrom. The glass includes the following components given in mol percent:

| | |
|---|---|
| germanium | 0.1–30 |
| arsenic | 0–40 |
| X | 0.01–20 |
| Y | 40–85 | wherein X is selected from the group consisting of gallium, indium and mixtures thereof wherein Y is selected from the group consisting of selenium, and mixtures of selenium and up to 50% of sulfur substituted for selenium and the glass also contains 0.001–2 weight percent of a rare earth, based on the weight of said components. The fiber has a minimum loss of less than 5 dB/m.

20 Claims, 2 Drawing Sheets

LOW PHONON ENERGY GLASS AND FIBER DOPED WITH A RARE EARTH

REFERENCE TO RELATED APPLICATION

This application is related to application entitled "Amplification By Means Of Doped Low Phonon Energy Glass Fiber" which is being filed concurrently with this application.

BACKGROUND OF INVENTION

1. Field of Invention

This invention pertains to a low phonon energy glass and glass fiber doped with a rare earth element.

2. Description of Prior Art

Low phonon energy glasses, which includes fluoride, sulfide, selenide and telluride glasses, have become extremely important as hosts for rare earth ions. For these systems doped with rare earths, radiative emissions normally quenched in oxide hosts have improved efficiencies. An example is the $^1G_4$-$^3H_5$ 1.3 μm transition for praseodymium in a fluoride host. This transition in the fluoride glass has been developed and commercialized as a fiber amplifier. This system shows poor gain since the transition has a low quantum efficiency due to the high multiphonon relaxation rate for the level in the fluoride host. This has motivated research into development of glasses with even lower phonon energies than the fluoride glass hosts.

Sulfide glass hosts have emerged as potential candidates for active applications at the 1.3 μm wavelength. Although the optical efficiency for praseodymium is higher than in the fluoride host, there are a couple of factors which limit the usefulness of the sulfide glass host. Firstly, the stability of the sulfide glasses used to-date is low and leads to crystallization during fiber drawing. Secondly, the rare earth ions tend to decrease the stability further which leads to more crystallization problems. As the absorption cross section for praseodymium is low, long fiber lengths are required for efficient device operation. Low loss fiber of about 0.1 dB/m or less is required, and to date, fabrication of low-loss sulfide fibers doped with a rare earth has not been realized due to significant crystallization during the fiber drawing. Therefore, there is a need for stable, rare earth doped, low phonon energy chalcogenide glasses which can be drawn into low loss fibers having a loss of less than 1 dB/m.

There is a need for bright sources in the infrared for infrared scene simulation and characterization of focal plane arrays on the Joint Strike Fighter and other seeker platforms. Furthermore, these bright fiber sources can be used in the fiber optic chemical sensor applications for facility clean up and in other government and industrial applications.

A companion application entitled "Infrared Transparent Selenide Glasses" was filed in USPTO on Mar. 14, 1997, and bears Ser. No. 08/818,204 discloses a glass comprising an alkaline earth selenide modifier, is now issued as U.S. Pat. No. 5,846,889, germanium selenide, gallium selenide and/or indium selenide, optionally doped with a rare earth. The glass components can be used as elements. The modifier is barium selenide or strontium selenide. Fibers from this glass have measured loss of greater than 10 dB/m whereas fibers made from the glass described herein have loss of less than about 1 dB/m.

OBJECTS AND SUMMARY OF INVENTION

An object of this invention is a low phonon energy glass and glass fiber made therefrom wherein the phonon energy is lower than that of fluoride and sulfide glasses.

Another object of this invention is a low phonon energy glass which has improved rare earth solubility.

Another object of this invention is a low phonon energy glass which has sufficient stability for fiberization.

These and other objects of this invention can be realized by a glass comprising less than about 30 mol percent germanium, less than about 40 mol percent arsenic, less than about 20 mol percent gallium, about 40–85 mol percent selenium and an effective amount for fluorescence but less than about 2 mol percent of a rare earth.

DESCRIPTION OF PREFERRED EMBODIMENTS

Figure 1:
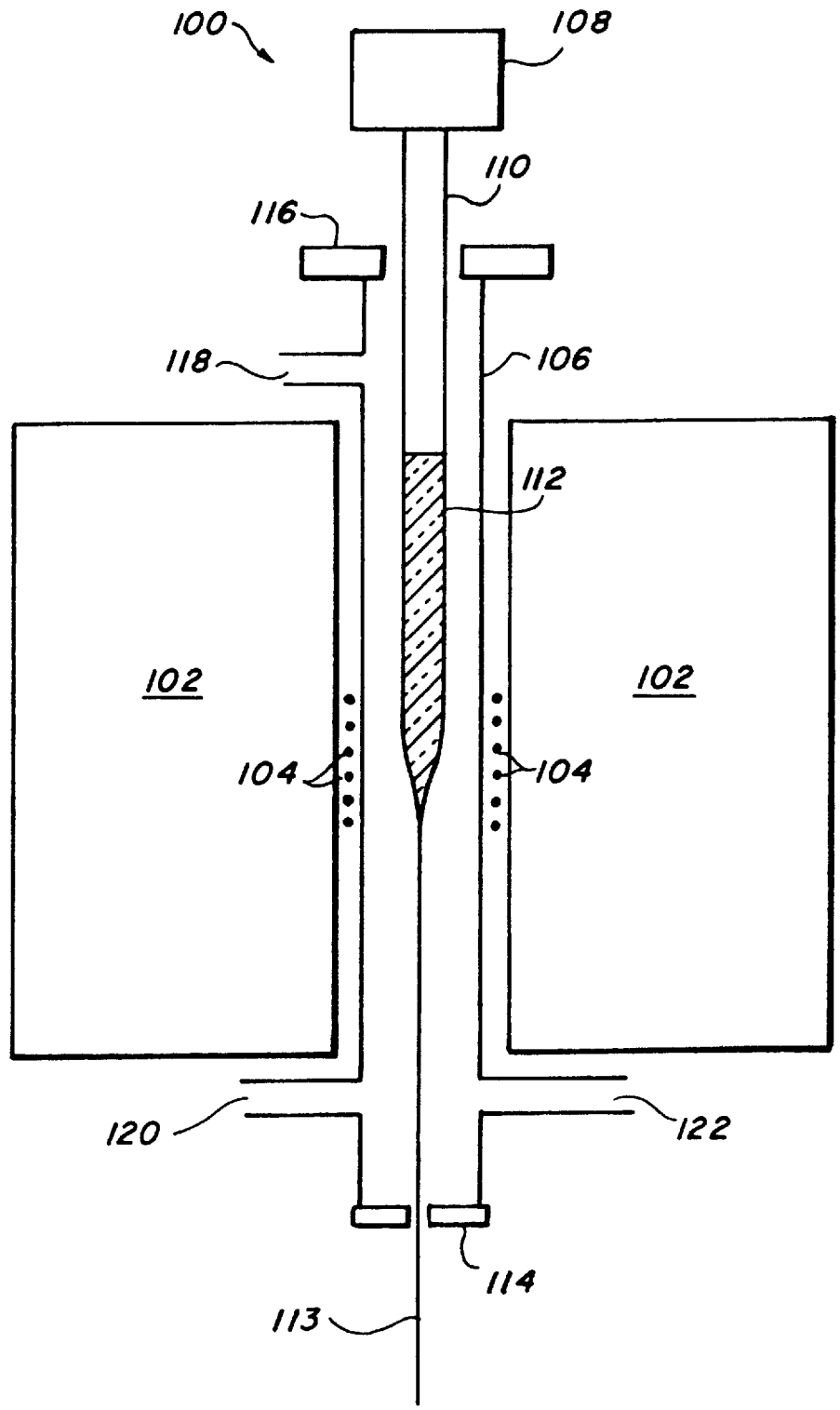
FIG. 1 is a schematic representation of the apparatus used to make the optical fiber of this invention.

The glass of this invention has a low phonon energy of less than about 350 cm$^{-1}$ and comprises the following components given in mol percent except the rare earth, which is given in weight percent:

| component | general range | preferred range | especially preferred range |
| --- | --- | --- | --- |
| germanium (Ge) | 0.1–30 | 1–25 | 5–20 |
| arsenic (As) | 0–40 | 1–30 | 5–20 |
| gallium (Ga) | 0.01–20 | 0.1–10 | 0.2–5 |
| selenium (Se) | 40–85 | 50–70 | 55–75 |
| rare earth (RE) | 0.001–2 | 0.01–1.5 | 0.05–1 |

Although any optically active additive can be used herein, such as transition metal ions, to promote fluorescence of the glass and the fibers made therefrom, preferred are praseodymium, dysprosium, erbium, neodymium, cerium, holmium, thulium, terbium, ytterbium, and mixtures thereof. Lanthanum and gadolinium are not considered optically active. Especially preferred optically active additives are dysprosium, praseodymium and mixtures thereof.

Sulfur can be substituted for selenium in amount of up to about 50%, preferably less than 30%. Indium can be substituted either partially or entirely for gallium. Other components can be added to the glass of this invention to improve optical, thermal and/or mechanical properties thereof. These other components include tellurium in an amount of up to 20% on mol basis of the glass components, to modify refractive index; a halogen or a mixture thereof, particularly iodine in an amount of up to 20% on mol basis of the glass components, to modify refractive index and increase rare earth solubility. Other additives when added to this glass in a small amount of up to 2 mol percent, based on the glass components, can make some improvement. These other additives include thallium, cesium, antimony, tin, lead, cadmium, copper, silver, yttrium, silicon, aluminum, phosphorus, tantalum, gadolinium, and halides.

The glass disclosed herein is a novel infrared transmitting chalcogenide glass based on germanium, arsenic, gallium, selenium and a rare earth. This glass is stable and can be easily fiberized, used to make a fiber optic amplifier for telecommunications, can be used as a bright source in the mid IR for infrared scene simulation and characterization of focal plane arrays on the Joint Strike Fighter and other seeker platforms. These bright sources can be used in fiber optic chemical sensor applications for facility clean up and other health related environmental monitoring.

The optical fiber made from the glass disclosed herein is fluorescent which results from the optically active rare earth present therein.

The glass fiber of this invention can be made conventionally and can be of any cross-sectional shape. Typically, however, the fiber is circular in cross-section. In the present specification, the fiber is described with reference to a circular cross-section. Those of ordinary skill in the art can extrapolate that description when producing fiber having other cross-sectional shapes. The fiber can be of any length desired and is about 20–500 microns in diameter, taking into account only the core and cladding surrounding the core. The core is about 0.5–90% of the fiber diameter, depending on whether it is single mode or multimode, with remainder being the cladding. The fiber loss is less than 5 dB/m, preferably less than 2 dB/m. In order to keep most of the transmitted light within the core, the refractive index of the core must be greater than refractive index of the cladding.

The glass disclosed herein can be prepared by batching the glass components in a drybox. Highly purified components are used in order to enhance infrared transmission, especially the mid-range infrared transmission. It is preferable to use components in elemental form rather than in the form of salts or compounds since the elemental form yields a more stable glass with a lower impurity level. All components can be purchased with the desired purity in excess of 99.9% purity on a metal basis. Selenium is available with a 99.999+% purity.

The batching step is carried out in a drybox by first weighing out the components. The weighing and batching steps are carried out in a drybox under an inert atmosphere with less than 1 ppm oxygen and water vapor to avoid oxidation and hydrolysis resulting in contamination of the components. The rare earth is added as the rare earth selenide, a rare earth chalcogenide, rare earth halide or as an elemental rare earth together with the selenium to form the rare earth selenide so as to incorporate the rare earth. In the drybox, the glass components are weighed out, batched and then transferred into a quartz ampule.

After transferring the glass components into a quartz ampule, the ampule is taken from the drybox, evacuated, and Sealed. After sealing, the ampule is heated to melt the contents and allow the contents to react at high temperatures to form the respective selenides. Typical melting schedules involve ramping the temperature from about room temperature to about 800 to 900° C. at a rate of about 1 to 10° C. per minute, then holding at about 800 to 900° C. for about ten to twenty hours. After heating to about 800 to 900° C., the contents are in a liquid state and are allowed to mix further to achieve a more uniform distribution within the molten glass.

After the melting process, the molten glass is quickly quenched from about 600–900° C. to about Tg or below in about 5 minutes in order to solidify the glass. Annealing of the glass is accomplished after solidification by extended heating of the glass at a temperature around $T_g$ in order to relieve stresses in the glass which may cause cracking/fracture of the glass blank. The glass is then characterized by powder x-ray diffraction and thermal analysis to confirm glass formation.

If the components are added in the form of selenide salts or compounds, it is not necessary to heat very slowly in order for the reaction of elemental selenium with the elemental metals to form the respective selenium compounds. Slow heating allows the selenium to fully react with the metal in a controlled manner. If selenide compounds are used, higher levels of oxide and hydroxide impurities are incorporated in the glass which will then reduce broadband infrared transmission because of absorption by the associated impurities in the residual precursors.

The glass fiber of this invention is made from a glass preform defined above in a conventional manner. Drawing of the glass fiber is disclosed, for example, in the Sanghera et al patent application Ser. No. 08/672,771, filed Jun. 28, 1996, entitled "Method For Producing Core/Clad Optical Fiber Preforms Using Hot Isostatic Pressing," and bearing docket number NC 76,989, incorporated herein by reference for all purposes.

Having described the invention, the following examples are given as particular embodiments thereof and to demonstrate the practice and advantages thereof. It is understood that the examples are given by way of illustration and are not intended to limit the specification or the claims in any manner.

EXAMPLE 1

This example demonstrates preparation of $Ge_{16.5}As_{18.8}Ga_{0.2}Se_{64.5}$ glass of this invention doped with 200 ppm of dysprosium.

A silica glass ampule with a wall thickness of 3 mm was first etched with dilute hydrofluoric acid, washed with deionized water and dried in an oven at about 110° C. The dried ampule was then brought into a drybox containing less than 1 parts per million (ppm) water and oxygen. In the drybox, individual elements were weighed to provide the following glass composition: $Ge_{16.5}As_{18.8}Ga_{0.2}Se_{64.5}$. The purity of the elements based upon weight percent were Ga—99.99999%, Ge—99.9999%, Ar—99.9995% and Se—99.995%. The selenium and arsenic were further purified by distilling them to remove water, oxides and carbon. The total weight of the batch was 10 grams with an additional 200 ppm dysprosium metal which was used to dope the glass.

The batch was mixed and loaded into the ampule. Using the vacuum valve assembly, the ampule was sealed, removed from the drybox and hooked up to the vacuum system which consisted of a turbomolecular pump and a mechanical pump. The assembly was evacuated for about one hour and then the silica ampule was sealed off with an oxygen-methane torch. The sealed ampule was then placed into a furnace and the glass components were melted. The melting schedule was as follows: 10° C./min to 500° C., dwell at 500° C. for 3 hours; ramp at 5° C./min to 900° C., dwell for 14 hours; ramp at 10° C./min to 750° C., dwell for 2 hours. A rocking furnace was used to ensure adequate mixing of the batch components. The rocking was suspended during the 750° C. dwell for fining of the glass. The ampule was removed from the furnace at 750° C. and quenched in water. The glass was subsequently annealed at 210° C. for approximately 3 hours, slowly cooled to room temperature and removed from the ampule for characterization and fiberization.

Other glasses of this invention were prepared as described in Ex. 1 and their compositions, and composition of the glass of Ex. 1, are given in Table A, below, with some additional information:

Table A—Glasses of This Invention

| Composition | Dopant | Dopant (ppm) | $T_g$ (° C.) | $T_{draw}$ (° C.) | Fiber Loss (dB/m) |
|---|---|---|---|---|---|
| 1. $Ge_{16.5}As_{18.8}Ga_{0.2}Se_{64.5}$ | Pr | 200 | 237 | 387 | 0.7 @6.61 μm |
| 2. $Ge_{16.5}As_{18.3}Ga_{0.7}Se_{64.5}$ | Pr | 2000 | 237 | 370 | 1.8 @6.07 μm |
| 3. $Ge_{12.5}As_{18.8}Ga_{0.2}Se_{58.5}S_{10}$ | Dy | 200 | 167 | 352 | 2.6 @6.05 μm |
| 4. $Ge_{16.5}As_{18.8}Ga_{0.2}Se_{64.5}$ | Dy | 750 | 237 | 385 | 1.2 @6.19 μm |

EXAMPLE 2

This example demonstrates drawing a glass fiber from the glass of this invention. The apparatus used to draw the fiber is shown in FIG. 1.

A glass preform of the composition $Ge16.5As_{18.8}Ga_{0.2}Se_{64.5}$ doped with about 200 ppm praseodymium was melted in accordance with Ex. 1. Approximately 1000 ppm of tellurium chloride ($TeCl_4$) was also doped into the glass to reduce the mid-IR H—Se absorption band. The preform had a nominal diameter of 6 mm with a length of about 5 cm.

Figure 2:
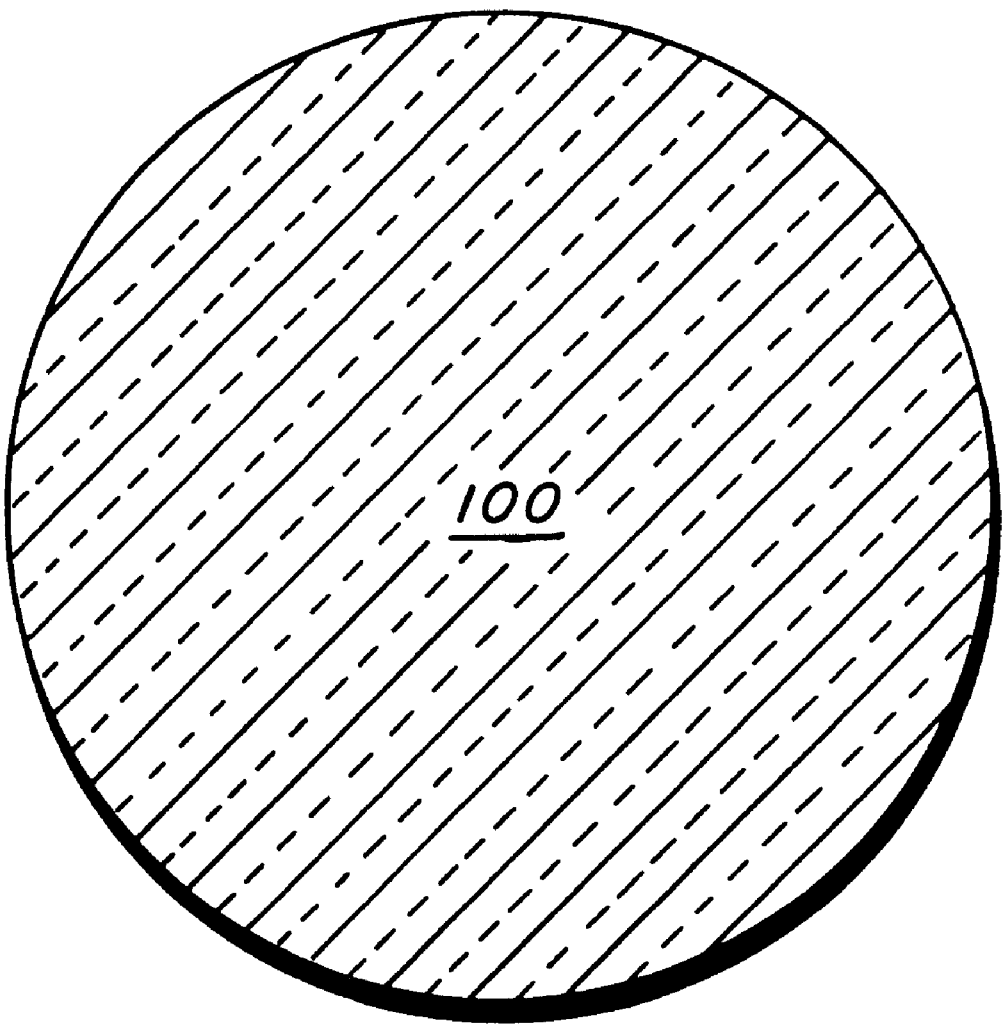
FIG. 2 is a radial cross sectional view of the optical fiber made pursuant to Ex. 2, herein, showing a core-only fiber.

The core-only fiber was drawn via the apparatus disclosed in patent application bearing the docket number of NC 76,989, identified more specifically earlier. The glass fiber was drawn at a temperature of 387° C. at about 2m/min. A total of 11 meters of the fiber was drawn. The minimal loss for a section of the fiber drawn from this preform measured approximately 0.7 dB/m at 6.61 μm. The fiber diameter was about 200 μm shown in FIG. 2.

Many modifications of the present invention are possible in light of the above teachings. It is, therefore, to be understood, that within the scope of the appended claims, the invention may be practiced otherwise than as specifically described.

What we claim is:

1. A glass having phonon energy of less than about 350 $cm^{-1}$ comprising the following components given in mol percent:

| germanium | 0.1–30 |
|---|---|
| arsenic | 0–40 |
| X | 0.01–20 |
| Y | 40–85 | wherein X is selected from the group consisting of gallium, indium and mixtures of gallium and indium; wherein Y is selected from the group consisting of selenium and mixtures of selenium and up to 50% sulfur substituted for selenium, said glass also containing 0.001–2 weight percent of an optically active rare earth, based on the weight of said components.

2. The glass of claim 1 wherein said glass contains up 2 mol percent of other additives selected from the group consisting of thallium, cesium, antimony, tin, lead, cadmium, copper, silver, ytterbium, silicon, aluminum, phosphorus, tantalum, gadolinium, halides and mixtures thereof.

3. The glass of claim 2 wherein said rare earth is selected from the group consisting of praseodymium, dysprosium, erbium, neodymium, cerium, holmium, thulium, terbium, ytterbium, and mixtures thereof.

4. The glass of claim 2 wherein said rare earth is selected from the group consisting of dysprosium, praseodymium and mixtures thereof.

5. The glass of claim 2 wherein amount of germanium is 1–25, amount of arsenic is 1–30, amount of X is 0.1–10, amount of Y is 50–75 and amount of rare earth is 0.01–1.5.

6. The glass of claim 5 wherein said rare earth is selected from the group consisting of praseodymium, dysprosium, erbium, neodymium, cerium, holmium, thulium, terbium, ytterbium, and mixtures thereof.

7. The glass of claim 5 wherein said rare earth is selected from the group consisting of dysprosium, praseodymium and mixtures thereof.

8. The glass of claim 2 wherein amount of germanium is 5–20, amount of arsenic is 5–20, amount of X is 0.2–5, amount of Y is 55–75 and amount of rare earth is 0.05–1.

9. The glass of claim 8 wherein said rare earth is selected from the group consisting of praseodymium, dysprosium, erbium, neodymium, cerium, holmium, thulium, terbium, ytterbium, and mixtures thereof.

10. The glass of claim 8 wherein said rare earth is selected from the group consisting of dysprosium, praseodymium, and mixtures thereof.

11. An optical fiber having outer diameter of 20–500 microns and made from glass comprising the following components given in mol percent:

| germanium | 0.1–30 |
|---|---|
| arsenic | 0–40 |
| X | 0.01–20 |
| Y | 40–85 | wherein X is selected from the group consisting of gallium, indium and mixtures of gallium and indium; wherein Y is selected from the group consisting of selenium and mixtures of selenium and up to 50% sulfur substituted for selenium; said glass also containing 0.001–2 weight percent of a rare earth, based on the weight of said components.

12. The fiber of claim 11 wherein said glass contains up 2 mol percent of other additives selected from the group consisting of thallium, cesium, antimony, tin, lead, cadmium, copper, silver, ytterbium, silicon, aluminum, phosphorus, tantalum, gadolinium, halides and mixtures thereof.

13. The fiber of claim 12 wherein said rare earth is selected from the group consisting of praseodymium, dysprosium, erbium, neodymium, cerium, holmium, thulium, terbium, ytterbium, and mixtures thereof.

14. The glass of claim 12 wherein amount of germanium is 1–25, amount of arsenic is 1–30, amount of X is 0.1–10, amount of Y is 50–75 and amount of rare earth is 0.01–1.5.

15. The glass of claim 14 wherein said rare earth is selected from the group consisting of praseodymium, dysprosium, erbium, neodymium, cerium, holmium, thulium, terbium, ytterbium, and mixtures thereof.

16. The glass of claim 14 wherein said rare earth is selected from the group consisting of dysprosium, praseodymium and mixtures thereof.

17. The glass fiber of claim 14 that is single mode, has loss of less than 5 dB/m and wherein said rare earth is selected from the group consisting of dysprosium, praseodymium and mixtures thereof.

18. The glass fiber of claim 17 wherein said fiber comprises a core and a cladding surrounding said core, said core is 0.5–90% of the fiber diameter with remainder being the cladding.

19. The glass of claim 12 wherein amount of germanium is 5–20, amount of arsenic is 5–20, amount of X is 0.2–5, amount of Y is 55–75 and amount of rare earth is 0.05–1.

20. The glass of claim 19 wherein said rare earth is selected from the group consisting of dysprosium, praseodymium and mixtures thereof.

\* \* \* \* \*